Jan. 6, 1959 E. N. KAUFMAN 2,867,735

BIAS CONTROL CIRCUIT

Filed March 7, 1955

INVENTOR.
EDWIN N. KAUFMAN
BY HIS ATTORNEYS.
HARRIS, KIECH, FOSTER & HARRIS

United States Patent Office 2,867,735

Patented Jan. 6, 1959

2,867,735

BIAS CONTROL CIRCUIT

Edwin N. Kaufman, Downey, Calif., assignor to The Goldak Company, Glendale, Calif., a partnership Application March 7, 1955, Serial No. 492,351

12 Claims. (Cl. 307—88.5)

This invention relates to an electrical circuit which will not pass low level signals or noise, but which will pass higher level signals virtually undisturbed and, in particular, to such a circuit which does not require the use of thermionic tubes.

It is often desirable in electrical applications to provide a stage which will transmit signals only when they are above a certain minimum voltage level. In this way, the undesired noise associated with zero-signal and low signal conditions can be eliminated without seriously degrading the performance of the device when higher level signals are present. Circuits have been devised which accomplished this desired result using thermionic vacuum tubes operated as class C amplifiers. However, such circuits are not practical in many applications because of the electrical power consumed therein. Accordingly, it is an object of the invention to provide a control circuit which will pass no signals below a given reference level and which will pass those signals above the reference level with very little distortion. It is a further object of the invention to provide such a circuit which does not require thermionic devices.

Another object of the invention is to provide a control circuit which will operate with both transformer-coupled and resistive-coupled circuits. A further object of the invention is to provide a control circuit which can provide a half-wave or a sine wave output.

The invention also comprises novel details of construction and novel combinations and arrangements of parts, which will more fully appear in the course of the following description. However, the drawings merely show and the description merely describes preferred embodiments of the present invention as applied to a bias control circuit, which are given by way of illustration or example only.

In the drawings, wherein the same numerals identify identical elements:

Figure 1:
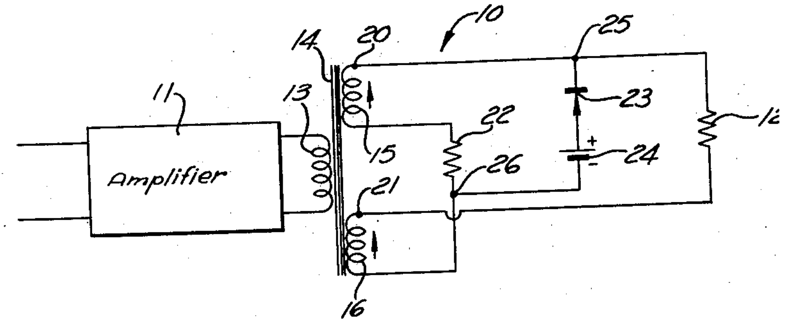
Fig. 1 is a circuit diagram of a preferred embodiment of the invention.

In Fig. 1, a bias control circuit 10 is shown coupled between an amplifier 11 and a load 12, the output of the amplifier 11 being connected to a primary winding 13 of an output transformer 14. The transformer 14 is provided with two secondary windings 15, 16 having equal outputs for a given input to the primary winding 13, the ends 20, 21 of the respective secondary windings 15, 16 having the same phasing. The load 12 is connected between the ends 20, 21 of the two secondary windings which may be referred to as the load terminals of the windings. An impedance element 22, which may be a resistor, is connected between the other ends of the two secondary windings which may be referred to as the bias terminals of the windings. For optimum performance of the circuit, the impedance of the element 22 is made approximately the same as the impedance of the secondary windings 15, 16; however, the actual impedance of the element 22 is not critical. A rectifier 23 is serially connected to a direct current voltage source, such as a battery 24, and the series combination is connected across a junction point 25 between the secondary winding 15 and the load 12 and a junction point 26 between the secondary winding 16 and the element 22.

Consider the operation of the circuit when the series combination of the rectifier and battery is omitted. When a signal is applied to the primary winding 13 equal voltages will be produced by the two secondary windings 15, 16. However, since the ends 20, 21 of the secondary windings which are connected to the load 12 have the same phasing, there will be no current in the load 12.

Now consider the operation of the circuit with the series combination of the rectifier 23 and the battery 24 connected between the points 25, 26. When the potential of point 25 with respect to point 26 is less than the sum of the breakdown potential of the rectifier 23 plus the potential of the battery 24, the conditions previously described will continue to exist, that is, there will be no current in the load 12. However, when the potential of point 25 with respect to point 26 exceeds this sum, there will be a current in the rectifier-battery combination which serves to maintain the output of the secondary winding 15 at this level. The sum of the breakdown potential and the battery potential may be referred to as the clamping potential of the circuit. Hence, when the output of the secondary winding 15 is greater than the clamping potential, a half-wave rectified signal which is proportional to the magnitude of the secondary voltage less the clamping potential, will be applied to the load 12. Thus, it is seen that when the output of the secondary winding 15 is less than the clamping potential, no signal will be transmitted to the load 12 from the primary winding 13, thereby blocking out the noise and low level signals. However, when the signal level increases, signals will be coupled from the primary 13 to the load 12 reduced only by the magnitude of the clamping potential.

The voltage of the battery 24 may be adjusted to provide any desired clamping potential depending upon the signal level at which it is desired to initiate the clamping action. The battery voltage may be reduced to zero or the battery may be omitted entirely; in which case, the clamping potential will be equal to the breakdown potential of the rectifier 23.

Figure 2:
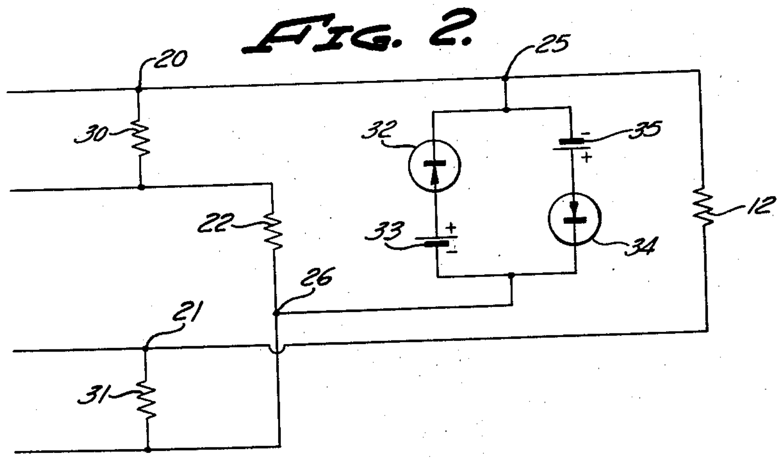
Fig. 2 is a circuit diagram of an embodiment of the invention utilizing resistive coupling.

The circuit of Fig. 2 differs from that of Fig. 1 in that the input is resistive coupled rather than transformer coupled. Therein, two equal signals are applied across resistors 30, 31, the respective ends 20, 21 of the resistors 30, 31 having the same phasing. The load 12 and the element 22 are connected as in Fig. 1. A series combination consisting of a rectifier 32 and a battery 33 is connected between the junction points 25, 26. A second series combination consisting of a second rectifier 34 and a second battery 35 is also connected between the junction points 25, 26, the polarity of the second combination being opposite to that of the first combination.

In the circuit of Fig. 1, clamping action occurred only when junction point 25 was positive with respect to junction point 26. However, in the circuit of Fig. 2, clamping action will occur both when junction point 25 is positive and when negative with respect to junction point 26, thereby providing a sine wave output to the load 12.

Figure 3:
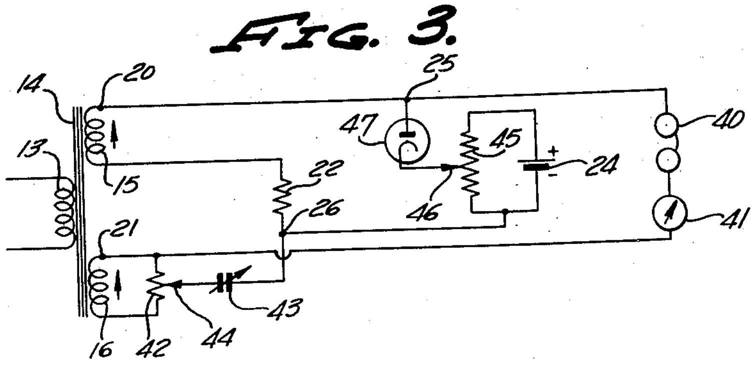
Fig. 3 is a circuit diagram of another embodiment of the invention.

In Fig. 3, a transformer coupled bias control circuit similar to that of Fig. 1 is shown having a set of head phones 40 and an ammeter 41 as a load. Means are provided for making the output of the secondary winding 16 exactly identical to that of the secondary winding 15. A balance potentiometer 42 is connected across the secondary winding 16 providing an adjustment of the magnitude of the output of the winding 16. A variable capacitor 43 is connected to an arm 44 of the potentiometer 42 and to the junction point 26 providing an adjustment for the phase shift between the outputs of the two secondary windings. A means for adjusting the clamping potential is also provided. A potentiometer 45 is connected across the battery 24 and an arm 46 of the potentiometer 45 is connected to the junction point 25 through a rectifier 47, the negative terminal of the battery 24 being connected to the junction point 26.

It is preferred in the practice of the invention that metallic rectifiers be used; however the circuit will operate satisfactorily with vacuum tube rectifiers also. Vacuum tube rectifiers have contact current which would ordinarily unbalance the circuit. Therefore, when a vacuum tube rectifier is utilized, it is desirable that a balance potentiometer, such as that indicated by the numeral 42 of Fig. 3, be included in the circuit to provide a balance adjustment.

Although several exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a control circuit for coupling the output of an amplifier to a load, the combination of: coupling means having an input and first and second outputs, each of said outputs having a load terminal and a bias terminal, the relative phasing of said first output load and bias terminals being the same as that of said second output load and bias terminals, said load terminals being adapted to be coupled directly to the load; an impedance element connected between said first and second bias terminals; and rectifying means connected between said first load terminal and said second bias terminal.

2. A circuit as defined in claim 1 including variable resistance means coupled to at least one of said outputs for adjusting the magnitude of said one output to correspond to the magnitude of said other output.

3. A circuit as defined in claim 1 including variable capacitance means coupled to at least one of said outputs for adjusting the phase of said one output to correspond to the phase of said other output.

4. In a control circuit for coupling the output of an amplifier to a load, the combination of: coupling means having an input and first and second outputs, each of said outputs having a load terminal and a bias terminal, the relative phasing of said first output load and bias terminals being the same as that of said second output load and bias terminals, said load terminals being adapted to be coupled directly to the load; an impedance element connected between said first and second bias terminals; and a bias unit comprising a serially connected rectifying means and voltage source, said bias unit being connected between said first load terminal and said second bias terminal.

5. A circuit as defined in claim 4 in which said voltage source includes means for varying the magnitude of said source.

6. In a control circuit for coupling the output of an amplifier to a load, the combination of: coupling means having an input and first and second outputs, each of said outputs having a load terminal and a bias terminal, the relative phasing of said first output load and bias terminals being the same as that of said second output load and bias terminals, said load terminals being adapted to be coupled directly to the load; an impedance element connected between said first and second bias terminals; and first and second bias units, each of said units comprising a rectifier and a voltage source, each of said units being connected between said first load terminal and said second bias terminal, the polarity of said first unit being opposite to the polarity of said second unit.

7. In a control circuit for coupling the output of an amplifier to a load, the combination of: first and second signal sources, each of said sources having a load terminal and a bias terminal, the relative phasing of said first source load and bias terminals being the same as that of said second source load and bias terminals, said first and second signal sources being energized from the same input, said load terminals being adapted to be coupled directly to the load; an impedance element connected between said first and second bias terminals; and rectifying means connected between said first load terminal and said second bias terminal.

8. In a control circuit, the combination of: two signal sources energized from the same input; circuit means interconnecting said sources, the interconnected portions of said sources having the same phasing; a series combination including a serially connected diode rectifier and resistor; and circuit means connecting said series combination across one of said sources.

9. In a control circuit for coupling the output of an amplifier to a load, the combination of: first and second signal sources, each of said sources having a load terminal and a bias terminal, the relative phasing of said first source load and bias terminals being the same as that of said second source load and bias terminals, said first and second signal sources being energized from the same input, said load terminals being adapted to be coupled directly to the load; circuit means interconnecting said first and second bias terminals; and rectifying means connected between said first load terminal and said second bias terminal.

10. In an output circuit for an amplifier having an output transformer, the combination of: two secondary windings on said transformer; a resistor connected to one end of each of said windings, said ends having the same phasing; a load connected to the other end of each of said windings; a bias unit comprising a serially connected rectifier and battery; and means connecting said bias unit between the junction point of said resistor and one of said windings and the junction point of said load and the other of said windings.

11. In an output circuit for a resistive coupled amplifier having two output resistors, the combination of: a third resistor connected to one end of each of said output resistors, said ends having the same phasing; a load connected to the other end of each of said output resistors; a bias unit comprising a serially connected rectifier and battery; and means connecting said bias unit between the junction point of said third resistor and one of said output resistors and the junction point of said load and the other of said output resistors.

12. In a control circuit for coupling the output of an amplifier to a load, the combination of: coupling means having an input and first and second outputs, each of said outputs having a load terminal and a bias terminal, the relative phasing of said first output load and the bias terminals being the same as that of said second output load and bias terminals, said load terminals being adapted to be coupled directly to the load; an impedance element connected between said first and second bias terminals; and a high-level-signal clipping unit comprising a diode rectifier and a voltage source serially connected, said clipping unit being connected between said first load terminal and said second bias terminal.

References Cited in the file of this patent

UNITED STATES PATENTS

| | | |
|---|---|---|
| 1,705,993 | Oswald | Mar. 19, 1929 |
| 1,811,915 | Carpe | June 30, 1931 |
| 1,853,678 | Gage | Apr. 12, 1932 |
| 1,969,657 | McCaa | Aug. 7, 1934 |
| 2,001,622 | McCaa | May 14, 1935 |
| 2,175,270 | Koch | Oct. 10, 1939 |